United States Patent
Jeanne et al.

(10) Patent No.: US 8,638,785 B2
(45) Date of Patent: Jan. 28, 2014

(54) METHOD OF TRANSMITTING DATA PACKETS

(75) Inventors: Ludovic Jeanne, Rennes (FR); Patrick Fontaine, Rennes (FR); Charline Guguen, Bourgbarre (FR)

(73) Assignee: Thomson Licensing, Issy-les-Moulineaux (FR)

( * ) Notice: Subject to any disclaimer, the term of this patent is extended or adjusted under 35 U.S.C. 154(b) by 0 days.

(21) Appl. No.: 12/451,579

(22) PCT Filed: May 20, 2008

(86) PCT No.: PCT/EP2008/056143
§ 371 (c)(1),
(2), (4) Date: Apr. 1, 2010

(87) PCT Pub. No.: WO2008/142062
PCT Pub. Date: Nov. 27, 2008

(65) Prior Publication Data
US 2010/0195567 A1    Aug. 5, 2010

(30) Foreign Application Priority Data
May 24, 2007   (FR) .................................... 07 55249

(51) Int. Cl.
*H04L 12/28* (2006.01)

(52) U.S. Cl.
USPC ............................ 370/389; 370/352; 370/392

(58) Field of Classification Search
USPC .................................................. 370/228–463
See application file for complete search history.

(56) References Cited

U.S. PATENT DOCUMENTS

| | | | |
|---|---|---|---|
| 6,570,866 B1 | 5/2003 | Murase et al. | |
| 6,633,576 B1 * | 10/2003 | Melaragni et al. | 370/412 |
| 6,775,280 B1 * | 8/2004 | Ma et al. | 370/392 |
| 6,778,495 B1 | 8/2004 | Blair | |
| 6,999,436 B2 * | 2/2006 | Zheng et al. | 370/331 |
| 7,006,472 B1 | 2/2006 | Immonen et al. | |
| 7,246,173 B2 * | 7/2007 | Le et al. | 709/238 |
| 7,305,240 B2 * | 12/2007 | Chou et al. | 455/450 |
| 7,385,924 B1 * | 6/2008 | Riddle | 370/235 |
| 7,433,307 B2 * | 10/2008 | Hooper et al. | 370/231 |
| 7,499,718 B2 * | 3/2009 | Stephenson et al. | 455/513 |
| 7,545,780 B2 * | 6/2009 | Chitrapu | 370/338 |
| 7,760,739 B2 * | 7/2010 | Jung et al. | 370/395.21 |
| 7,764,678 B2 * | 7/2010 | Johnson et al. | 370/389 |

(Continued)

FOREIGN PATENT DOCUMENTS

EP   1575224   9/2005

OTHER PUBLICATIONS

Search Report Dated Feb. 16, 2009.

*Primary Examiner* — Ayaz Sheikh
*Assistant Examiner* — Venkatesh Haliyur
(74) *Attorney, Agent, or Firm* — Myers Wolin LLC

(57) ABSTRACT

Method for transmission of data packets by a first station, the packets being intended for a destination node belonging to a network comprising a second station, said packets being transmitted by said first station to said destination node via said second station. In order to simplify the transmission, the method comprises:
- a routing of a set of at least one of the packets to the second station,
- a classification associated with the second station, the classification assigning a connection between the first station and the second station to the set of at least one of the packets,
- a transmission step of the set on the assigned connection.

8 Claims, 9 Drawing Sheets

(56) References Cited

U.S. PATENT DOCUMENTS

Figure 1:
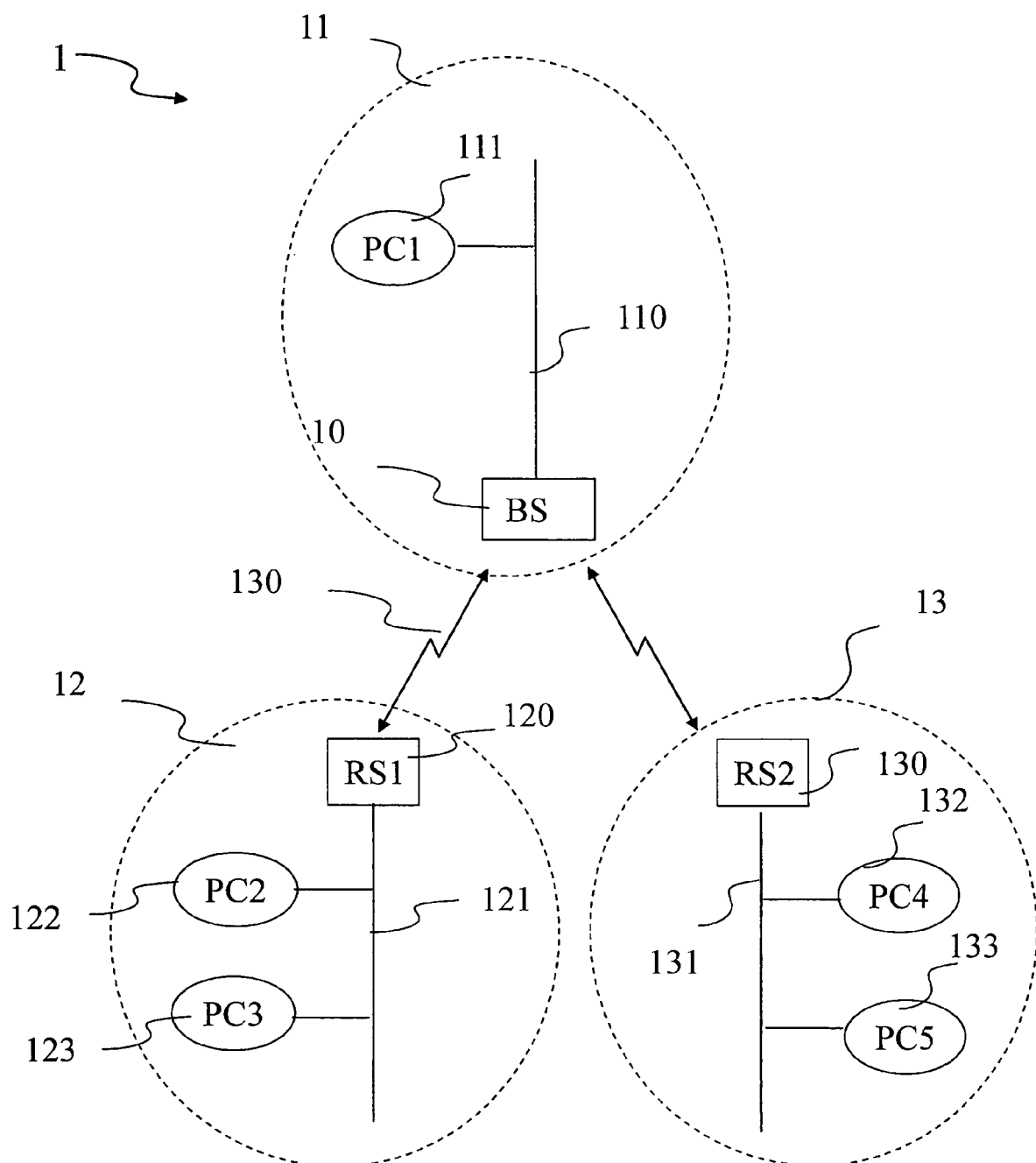

| | | | |
|---|---|---|---|
| 7,830,864 B2* | 11/2010 | Li | 370/352 |
| 7,891,001 B1* | 2/2011 | Greenawalt et al. | 726/22 |
| 7,974,266 B2* | 7/2011 | Le et al. | 370/351 |
| 8,068,460 B2* | 11/2011 | Fajardo et al. | 370/331 |
| 8,423,565 B2* | 4/2013 | Redlich et al. | 707/758 |
| 2002/0150062 A1* | 10/2002 | Zheng et al. | 370/331 |
| 2004/0001491 A1 | 1/2004 | Ruutu et al. | |
| 2007/0115899 A1* | 5/2007 | Ovadia et al. | 370/338 |
| 2007/0165565 A1* | 7/2007 | Jung et al. | 370/329 |
| 2008/0170535 A1* | 7/2008 | Zheng | 370/315 |
| 2009/0034526 A1* | 2/2009 | Ahmadi et al. | 370/392 |
| 2009/0116420 A1* | 5/2009 | Jeong et al. | 370/312 |
| 2009/0168770 A1* | 7/2009 | Mohanty | 370/389 |
| 2009/0232144 A1* | 9/2009 | Lee | 370/395.31 |
| 2009/0303918 A1* | 12/2009 | Ma et al. | 370/315 |

* cited by examiner

METHOD OF TRANSMITTING DATA PACKETS

This application claims the benefit, under 35 U.S.C. §365 of International Application PCT/EP2008/056143, filed May 20, 2008, which was published in accordance with PCT Article 21(2) on Nov. 27, 2008 in French and which claims the benefit of French patent application No. 0755249 filed May 24, 2007

SCOPE OF THE INVENTION

The present invention relates to the telecommunications domain and more specifically to the transmission of reliable data from a base station to remote stations connected to sub-networks.

TECHNOLOGICAL BACKGROUND

According to the prior art, several wireless or wired network architectures are known. Some of these are based on a centralized architecture with a base station exchanging data with the nodes of wired sub-networks, each sub-network being connected with the base station by a remote station via a wired or wireless link. The base station manages the transmission to the nodes of the wired sub-networks via a routing mechanism. The prior technique has the disadvantage of being relatively complex to implement, particularly when the number of nodes of the sub-networks is high.

In particular, a document U.S. Pat. No. 7,006,472 B1 discloses a wireless network supporting more than one quality of service levels with a classification relatively complex to implement.

The documents EP-A-1 575 224 and U.S. Pat. No. 6,778,495 B1 disclose data transmissions relatively difficult to implement.

SUMMARY OF THE INVENTION

The purpose of the invention is to overcome the disadvantages of the prior art.

More specifically, the purpose of the invention is to simplify the implementation of the transmission of data by at least one base station to the sub-network nodes, via remote stations associated with each sub-network, in particular, when the number of nodes is high.

The invention relates to a method for the transmission of data packets by a first station, the packets being intended for a destination node belonging to a network comprising a second station, the packets being transmitted by the first station to the destination node via the second station. In order to simplify the implementation of the transmission, the method comprises:
- a step of routing of a set of at least one of the packets to the second station,
- a classification step associated with the second station, the classification assigning a connection between the first station and the second station to the set of at least one of the packets,
- a transmission step of the set on the assigned connection.

The classification carried out after a routing is hence relatively simple to implement.

In particular it is easier to implement than according to the technique of the document U.S. Pat. No. 7,006,472 B1 cited previously, and which does not provide for routing to a second station followed by a classification. It is also easier than in the documents Ep-A-1 575 224 and U.S. Pat. No. 6,778,495 B1 that do not disclose the classification associated with the second station.

According to a particular characteristic, the routing implements structures each comprising:
- a destination node identifier,
- an identifier of the second station to which the destination node is associated, the identifier of the second station being associated with a classification function.

Advantageously, the classification function associated with an identifier of the second station comprises at least one test function intended to test at least one parameter of the packet and assign to the packet a connection.

According to a particular characteristic, the structures comprise an access counter that enables elimination of structures that are not used.

According to an advantageous characteristic, the link between the first station and the second station is a wireless link, for example of type IEEE 802 16.

Advantageously, the method comprises an aggregation of services destined for at least two destination nodes placed on the network, the aggregation being associated with the second station.

The aggregation of streams destined for distinct nodes placed behind a same second station is simplified because the classification functions do not require identification of the destination but a simple transmission to the second station.

LIST OF FIGURES

Figure 2:
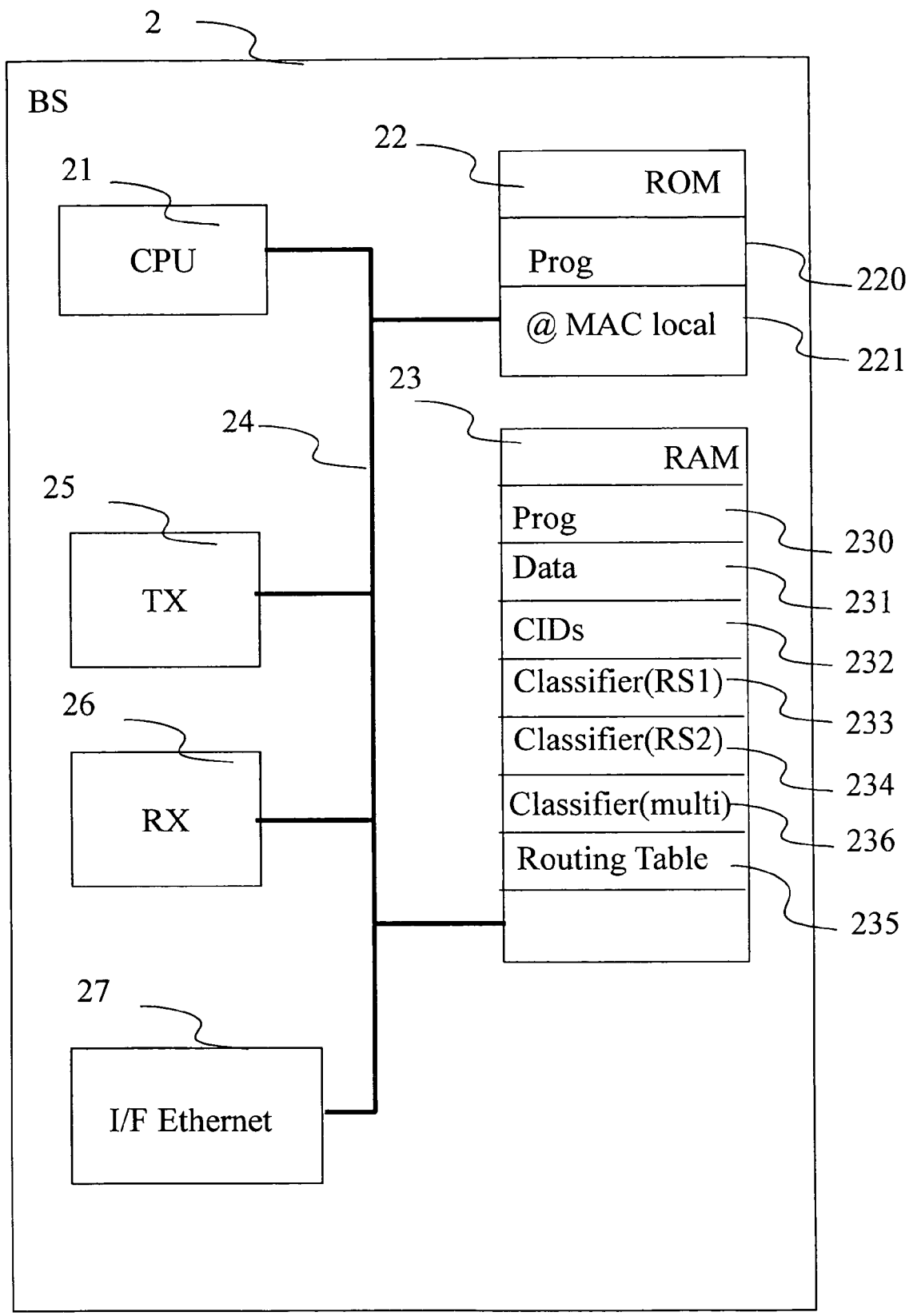
Figure 3:
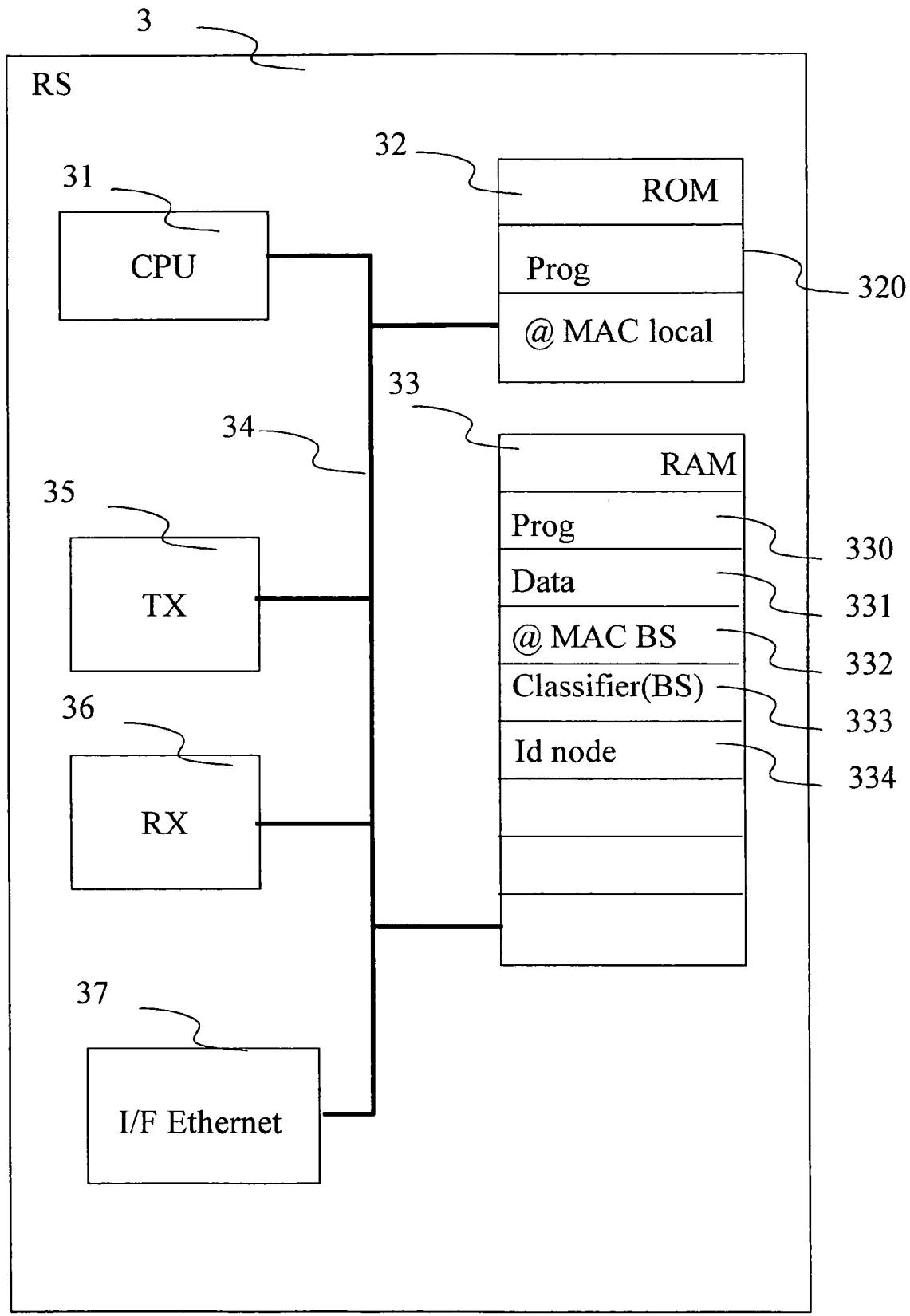
Figure 4:
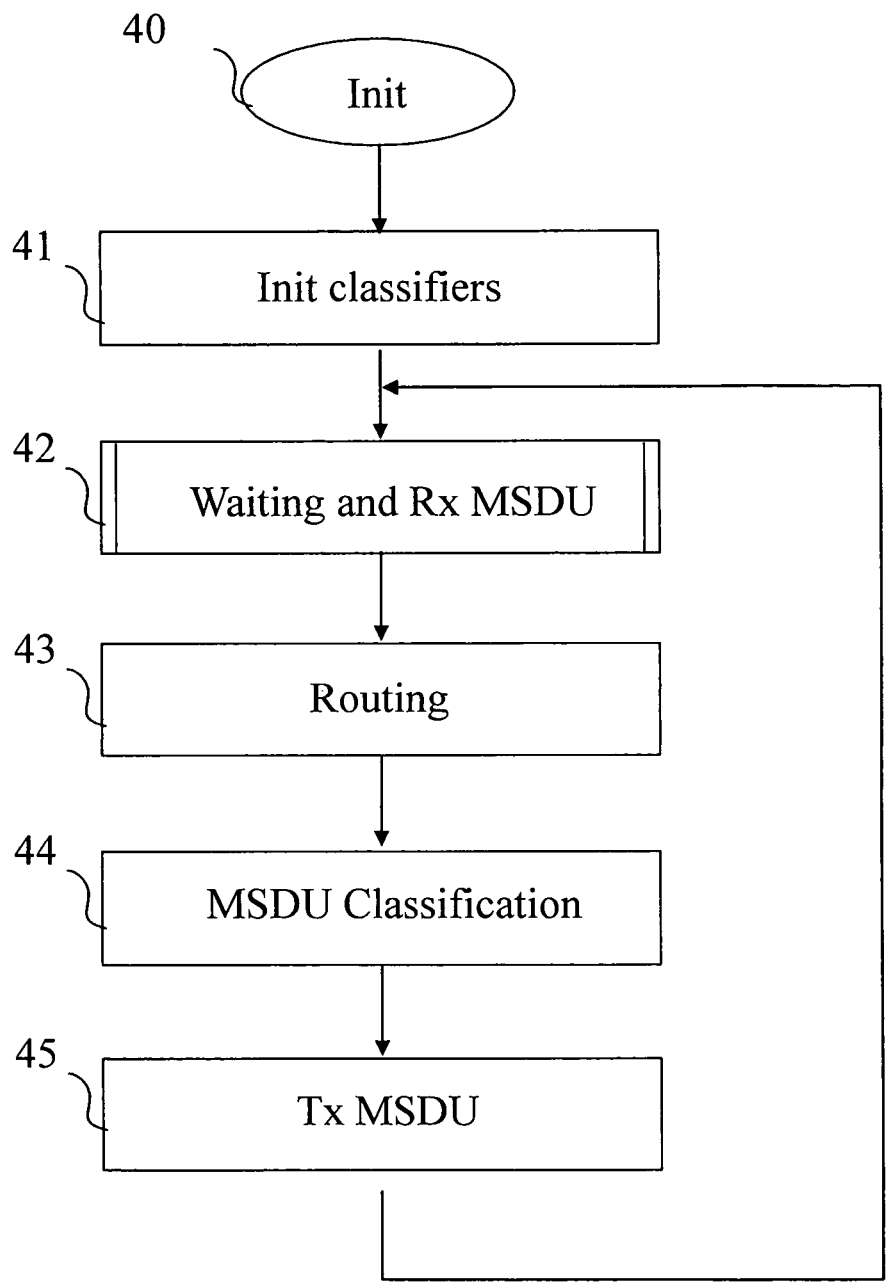
Figure 5:
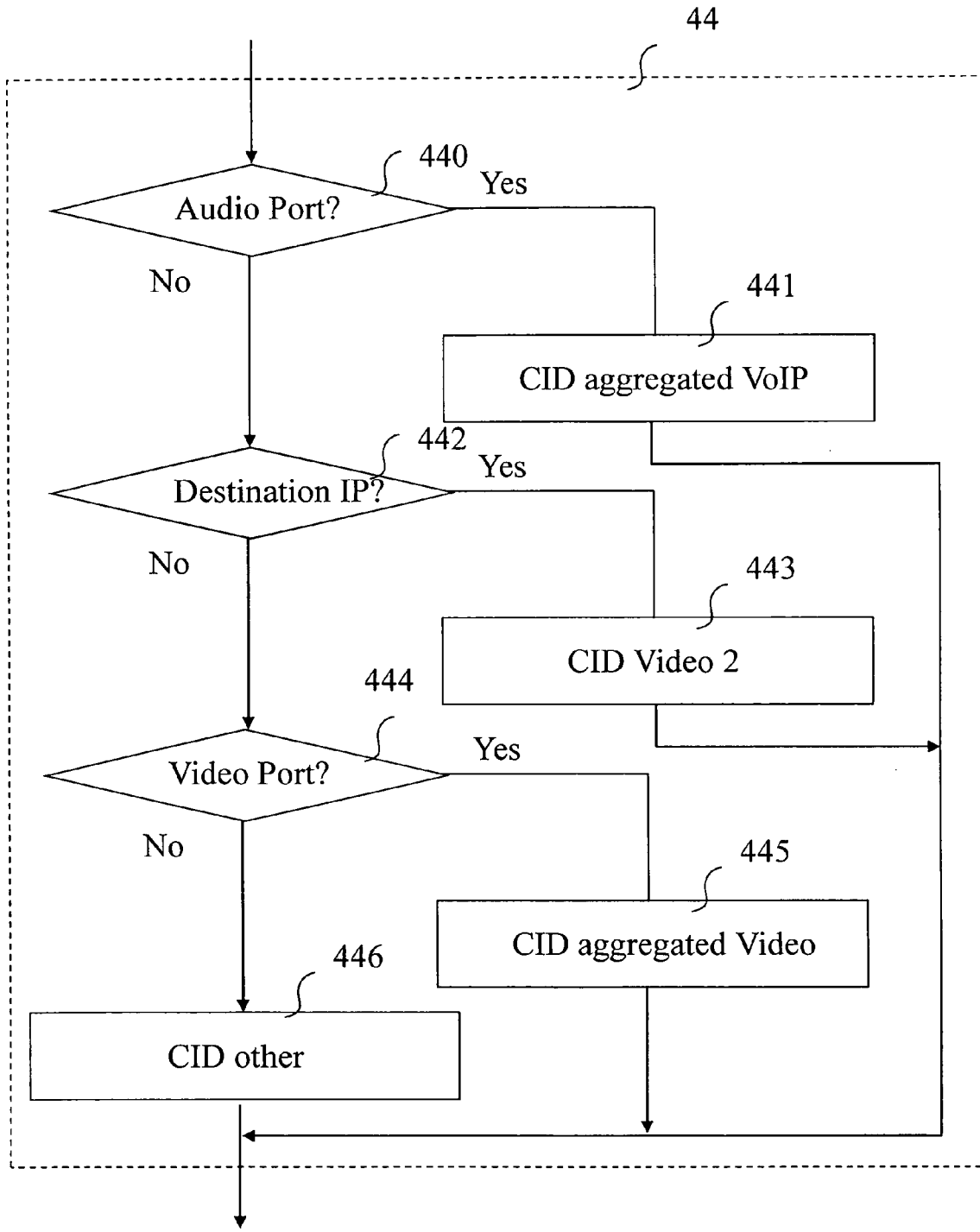
Figure 6:
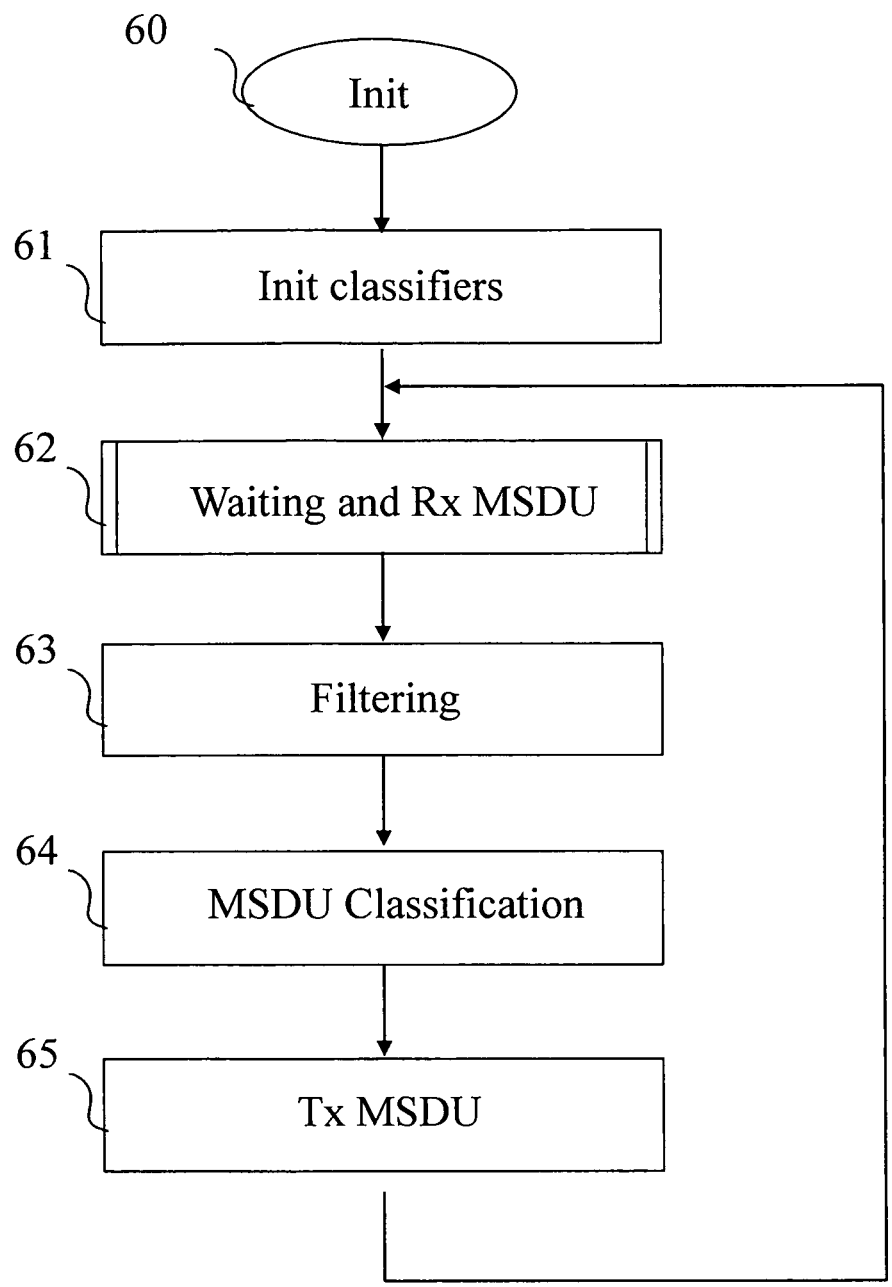
Figure 7:
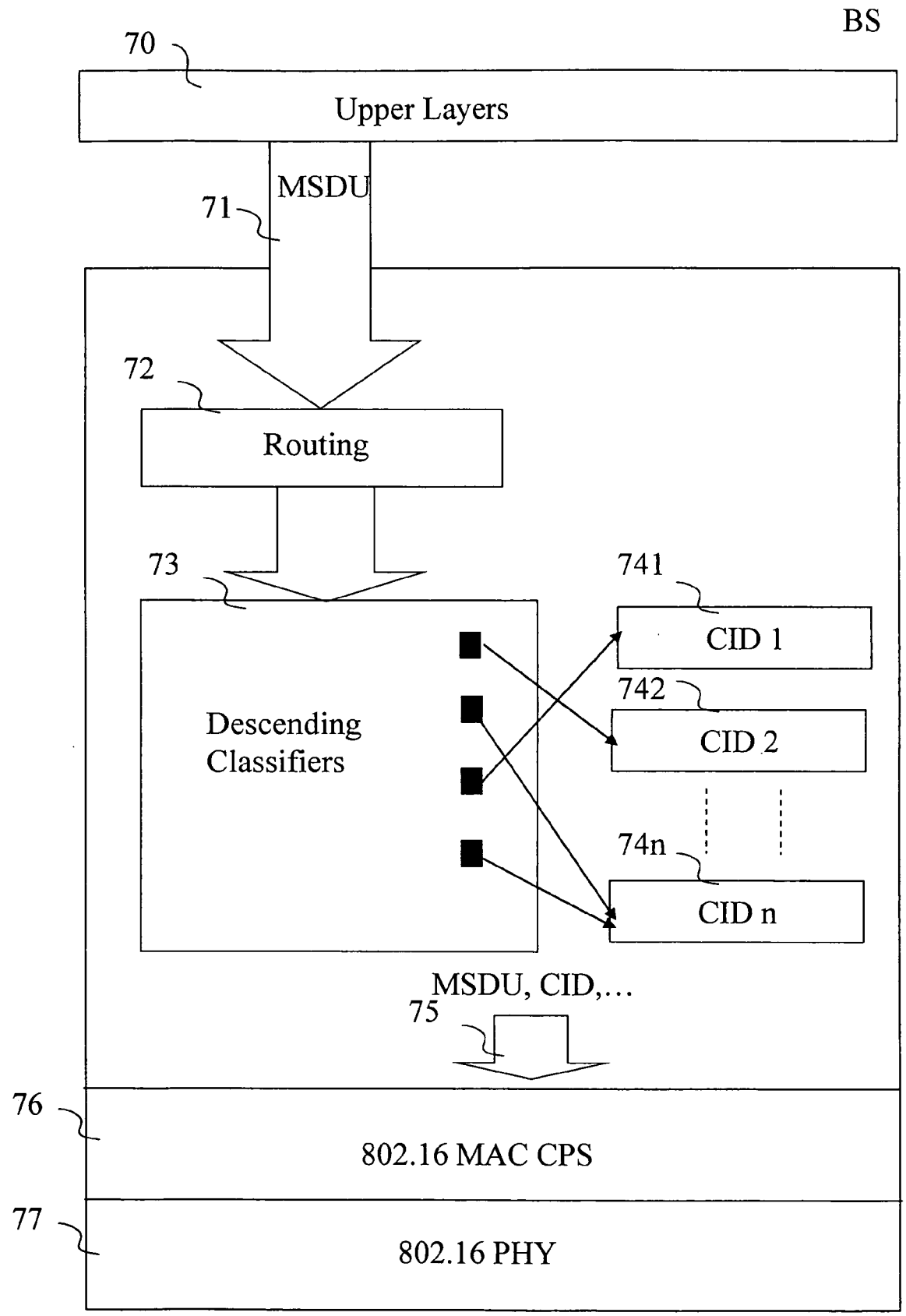
Figure 8:
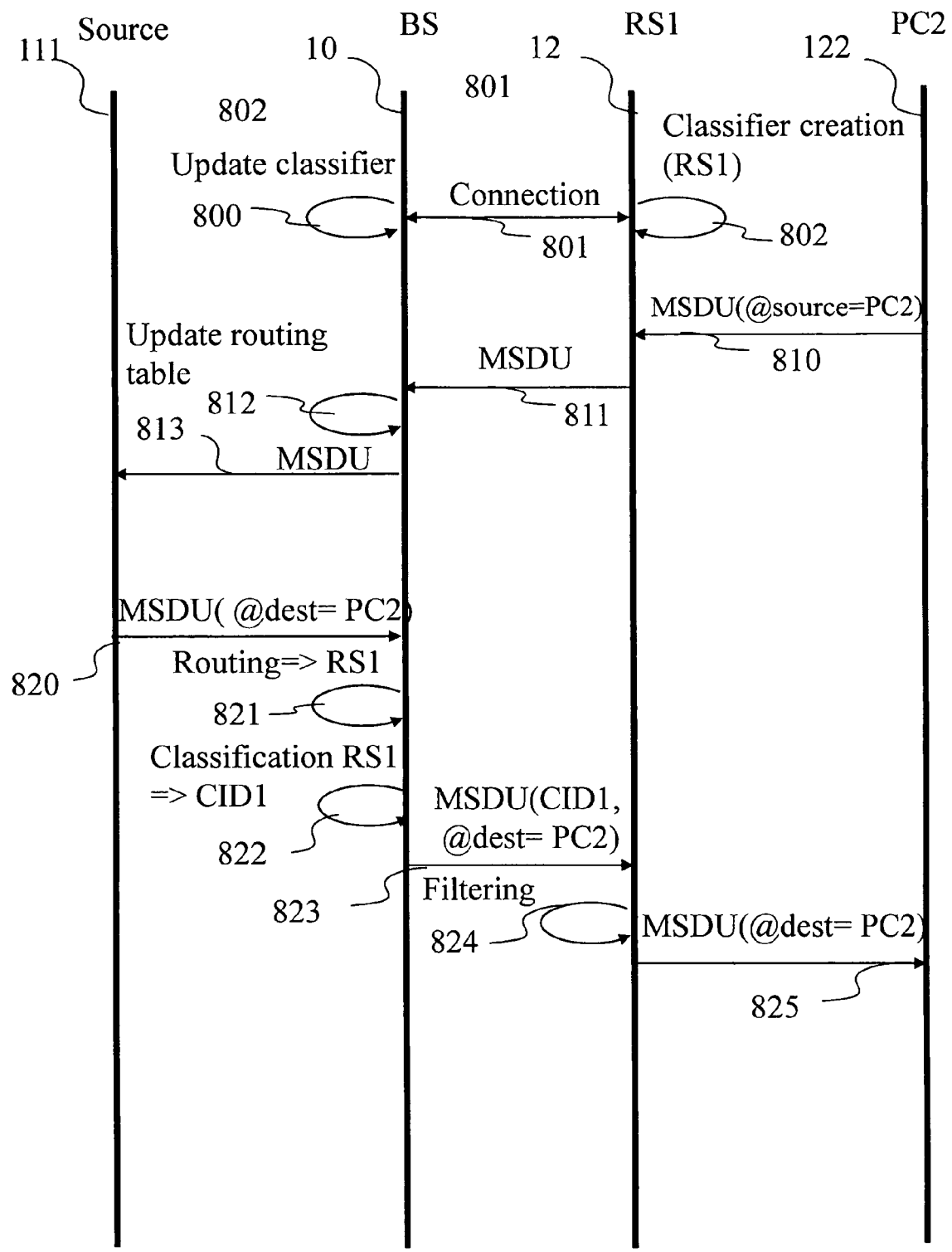
Figure 9:
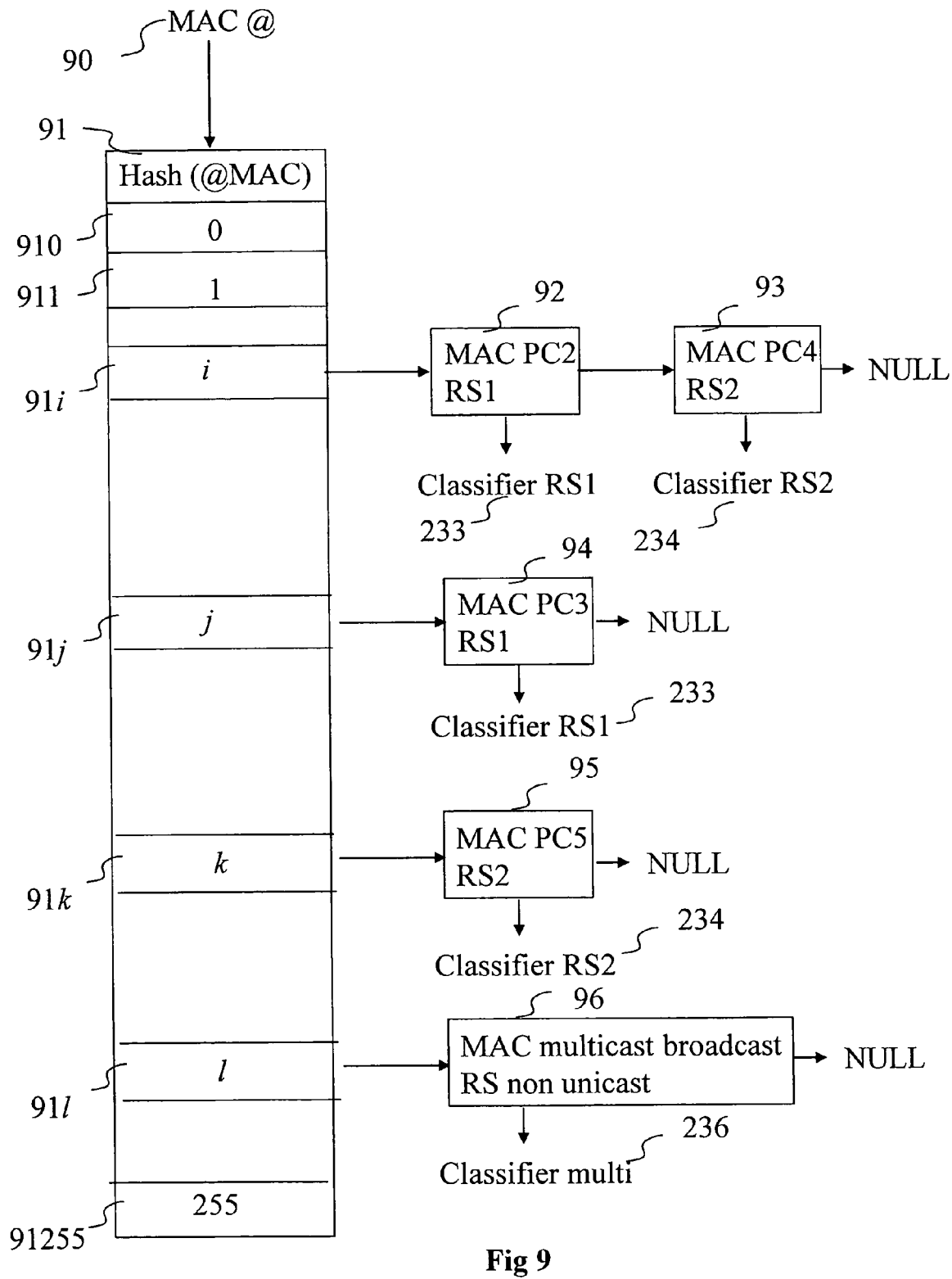

The invention will be better understood, and other specific features and advantages will emerge upon reading the following description, the description making reference to the annexed drawings wherein:

FIG. 1 illustrates an example of a communication network architecture with elements implementing the invention, FIGS. 2 and 3 diagrammatically show, respectively, a base station and a remote station belonging to the network of FIG. 1, according to a particular embodiment of the invention, FIGS. 4 and 5 show a method implemented in the base station of FIG. 2, according to a particular embodiment of the invention, FIG. 6 shows a method implemented in the remote station of FIG. 3, according to a particular embodiment of the invention, FIG. 7 shows a classification mechanism with a division into communication protocol layers implemented in the base station of FIG. 2, FIG. 8 illustrates an example of communication between different network elements of FIG. 1, and FIG. 9 shows a hash function implemented in the base station of FIG. 2.

DETAILED DESCRIPTION OF THE INVENTION

FIG. 1 shows a communications network 1 comprising three sub-networks 11 to 13 connected by bi-directional wireless links 130. For example, the link 130 is a long distance link and the sub-networks 12 and 13 are local networks (whose nodes are at a shorter distance).

The sub-network 11 is a wired Ethernet network (or IEEE 802.3) comprising:
- nodes (for example a node PC1 111) able to receive and/or transmit data packets,
- a base station or BS (Base Station or first station) 10, and
- a wire link 110 connecting the nodes and the BS.

The sub-network 12 (respectively 13) is a wired Ethernet network (or IEEE 802.3) comprising:
- nodes (for example the nodes PC2 122 and PC3 123 (respectively PC4 132 and PC5 133) able to receive and/or transmit data packets,
- an RS (Remote Station, or here, a second station or relay station) 120 (respectively 13), and
- a wire link 121 (respectively 131) connecting the nodes and the RS.

The BS 10 can transmit and/or receive data packets destined for or coming from nodes of the sub-networks 12 and 13 via the associated RS using the wireless link 130 according to an adapted communications protocol. The remote stations 120 and 130 enable the interface between the sub-network 111 and the sub-network 12 or 13 with which they are associated to be assured.

According to a variant of the invention, the network comprises more than one Base Station. In this case, the BS' advantageously use different physical channels (for example, frequency channels or CDMA (Code Division Multiple Access), temporal allocations or TDMA (Time Division Multiple Access)).

According to another variant of the invention, a part or all of the sub-networks 12 and 13 are wireless sub-networks.

Advantageously, the remote stations share the same radio frequency channel on the links 130, the radio spectrum being a resource to be economised. The subscriber stations can possibly listen mutually to each other on the radio channel. According to an embodiment variant, the subscriber stations cannot listen mutually to each other on the radio channel.

FIG. 2 diagrammatically illustrates a base station 2 (or first station) of network 1 corresponding to the base station 10.

The base station 2 comprises, connected to each other by an address and data bus 24, also transporting a clock signal:
- a microprocessor 21 (or CPU),
- a non-volatile memory of ROM (Read Only Memory) type 22,
- a Random Access Memory or RAM 23,
- a transmission module 25 of a signal on the wireless link,
- a reception module 26 of a signal on the wireless link, and
- an Ethernet interface 27 connected to the sub-network 110.

It is noted that the word "register" used in the description of memories 22 and 23 designates in each of the memories mentioned, a memory zone of low capacity (some binary data) as well as a memory zone of large capacity (enabling a whole programme to be stored or all or part of the data representing an audio/video service received).

The memory ROM 22 comprises in particular:
- a "prog" 220 program, and
- a MAC (Medium Access Control) address 221 specific to the base station.

The algorithms implementing the steps of the method specific to the invention and described below are stored in the memory ROM 22 associated with the base station 2 implementing these steps. When powered up, the microprocessor 21 loads and runs the instructions of these algorithms.

The random access memory 23 notably comprises:
- in a register 230, the operating programme of the microprocessor 21 responsible for switching on the base station 2,
- data or PDUs (Packet Data Unit) or SDUs (Service Data Unit) that can contain one or more PDUs in a register 231,
- connection identifiers or CID in a register 232,
- classification functions or classifiers associated with each of the remote stations in the registers 233 and 234,
- a classifier associated with a virtual remote station corresponding to a multicast or broadcast diffusion address in a register 236, and
- a routing table in a register 235.

FIG. 3 diagrammatically shows a remote station 3 of the network 1 corresponding to RS1 or RS2.

The remote station 3 comprises, connected to each other by an address and data bus 34, also transporting a clock signal:
- a microprocessor 31 (or CPU),
- a non-volatile memory of ROM (Read Only Memory) type 32,
- a Random Access Memory or RAM 33,
- a transmission module 35 of a signal on the wireless link,
- a reception module 36 of a signal on the wireless link, and
- an interface 37 to an Ethernet network.

It is noted that the word "register" used in the description of memories 32 and 33 designates in each of the memories mentioned, a memory zone of low capacity (some binary data) as well as a memory zone of large capacity (enabling a whole programme to be stored or all or part of the data representing an audio/video service received).

The memory ROM 32 comprises in particular:
- a "prog" 320 program, and
- A MAC address 321 specific to the remote station 3.

The algorithms implementing the steps of the method specific to the invention and described below are stored in the memory ROM 32 associated with the base station 3 implementing these steps. When powered up, the microprocessor 31 loads and runs the instructions of these algorithms.

The random access memory 33 notably comprises:
- in a register 330, the operating programme of the microprocessor 31 responsible for switching on the remote station 3,
- data or PDUs (Packet Data Unit) or SDUs (Service Data Unit) that can contain one or more PDUs in a register 331,
- a MAC address 332 specific to the base station connected to the remote station 3 in a register 332,
- a classification function or classifiers associated with the base station in a register 333, and
- node identifiers belonging to the sub-network associated with the remote station 3 (for example of MAC addresses and/or IP addresses type).

FIG. 4 shows a method used in the base station 2 according to a particular implementation of the invention.

This method begins with an initialisation phase 40 during which the different parameters of the station 2 are updated.

Then, during a step 41, the base station 2 initializes the classifiers 233 and 234 associated with each of the remote stations during the establishment of connections with the remote stations. The base station also initializes a routing table 235 pointing to the corresponding classifier for each destination node belonging to the sub-networks 12 and 13.

FIG. 9 shows an example of a routing table 235 according to a MAC address 90 present in a data packet intended for a node of one of the sub-networks 12 and 13, and more precisely a hash function comprising N filters $91x$ (910 to 91255) (for N worth 256, N being able to take any value) that sends back to the pointers when there is correspondence between the filter and the MAC address 90. This hash function enables reducing the complexity of the destination MAC addresses search algorithm. Each input of the table points to a linked list of MAC structure. Each structure points to an RS to which the destination node is connected. In the BS, the broadcast addresses or multicast destinations are "mapped" on the non unicast remote station allocated in initialization. Hence, when a PDU must be transmitted in multicast mode or broadcast, a specific non unicast classifier 236 is used for the multicast or broadcast type connections. Hence advantageously, these cases are processed similarly to a unicast transmission.

The unicast type addresses are inserted automatically in the hash table when they are found in the source address of a packet previously transmitted by the destination. If a node moves from a sub-network to another sub-network, the table is updated.

The broadcast address is inserted at initialization when a broadcast connection is created.

The purpose of the hash function is to transform a MAC address into a table index, it returns for example an "exclusive or" function (xor) of the modulo 256 MAC address field. This index is used to identify a first pointer of a structure linked list. A MAC address search is carried out until the correct MAC address is found. If this latter is not found, the corresponding SDU is removed.

The filters associated with the MAC address or addresses indicated in the SDU send back one or more access structures to a classifier, linked. A structure comprises, for example, a pointer to a next structure, a destination node identifier (for example the MAC address or addresses (and/or, according to a variant, the IP address or addresses) indicated in the SDU, and a classifier function associated with an identifier of the RS (for example in the form of a pointer to a structure associated with an RS (or broadcast/multicast address) that comprises the corresponding classifier and an access counter). Advantageously, the classification function associated with an identifier of the RS comprises at least one test function intended to test one or more parameters of the packet and assign to the packet a connection. The access counter is a variable that enables detection that a MAC address is no longer used and so deletes it from the access structure. The access counters are incremented each time the corresponding MAC address is identified. Independently, they are read and reset to zero. If during the read, a counter associated with a unicast address is already at zero, then the access structure is deleted from the hash table (the MAC address was not used since the last reset to zero).

Hence, as an example, the filter 91*i* (i being comprised between 2 and 255) resends to a first access structure of a classifier 92, associated with the MAC address of the node PC2 and the station RS1. If the MAC address 90 at input corresponds to the MAC address of the node PC2, the structure 92 points to the classifier 233 associated with RS1, if not it points to a second access structure of a classifier 93 associated with the MAC address of the node PC4 and the station RS2. If the MAC address 90 at input corresponds to the MAC address of a node PC4, the structure 93 points to the classifier 234 associated with RS2, if not it points to a pointer NULL indicating that the MAC address 90 at input is not that of a node of one of the sub-networks 12 or 13.

The filter 91*j* (j being comprised between 0 and 255) resends to an access structure of a classifier 94, associated with the MAC address of the node PC3 and the station RS1. If the MAC address 90 at input corresponds to the MAC address of the node PC3, the structure 94 points to the classifier 233 associated with RS1, if not it points to a pointer NULL.

The filter 91*k* (k being comprised between 0 and 255) resends to an access structure of a classifier 95, associated with the MAC address of the node PC5 and the station RS2. If the MAC address 90 at input corresponds to the MAC address of the node PC5, the structure 95 points to the classifier 234 associated with RS2, if not it points to a pointer NULL.

The filter 91*l* (l being comprised between 0 and 255) resends to an access structure of a classifier 96 associated with the MAC address of multicast or broadcast type and a corresponding virtual station (non unicast specific station). If the MAC address 90 at input corresponds to a multicast or broadcast type MAC address, the structure 96 points to the classifier 236 associated with the virtual station, if not it points to a pointer NULL.

After the step 41, during a step 42, the station 2 waits then receives at least one SDU intended for a node belonging to one of the sub-networks 12 or 13 and coming from a sub-network 110, 12 or 13 to which the destination node does not belong.

Then, during a step 43, the station 2 carries out a routing using table 91 shown in FIG. 9 to determine the classifier associated with the remote station where the non-unicast classifier 236 can relay the SDU to the destination node or nodes. This operation is relatively simple, as the station 2 only needs to know the associated classifier.

After the routing step 43, during a step 44, the station 2 carries out a classification of the SDU using the pointer to the classifier determined in step 43. This classification is associated with an RS or is of non-unicast type, and attributes a unicast connection between the station 2 and an RS or a non-unicast type connection to the packet or packets to be transmitted.

The classifier functions 233 (respectively 234) pointed by the structures 92 and 94 (respectively 93 and 95) are advantageously identical which enables simplifying the implementation of routing and classification. According to the prior art, there is no explicit routing before a classification and two classification functions associated with two different connections are different and can comprise a test on the destination node.

According to the prior art, there is only one result of strictly ordered classifier functions, the first to provide a positive result triggers the transmission of the MSDU in the connection associated with this classifier function. This means that all the classifier functions must be different. Consequently, a too general classification criterion doe not enable the transmission of data via different SS. For example, if the voice over IP Ethernet frames are transported on a virtual network n°5 and there are several items of equipment connected behind several RS, there should be as many classifier functions as there are items of equipment to be addressed: this obliges systematically using the destination equipment address as a supplementary parameter of the classifier function. According to the invention, the classification is simplified because the classifier functions are associated with remote stations that can communicate directly with the base station and not with the nodes of the sub-networks, placed behind the remote stations.

Then, during a step 45, the station 2 transmits the SDU to the remote station 120 or 130 associated with the classifier determined in step 43. As an example, this step 45 can comprise a preparation of one or more PDUs corresponding to an eventual cut-off of the SDU received and/or a regrouping of more than one received SDUs, and the transmission of the prepared PDU or PDUs. Then, step 42 is repeated.

The reception of the MSDU by the base station, for a transmission to the network 110 is made in any way and will not be detailed.

FIG. 5 details the classification step 44 according to an example provided here as an example. During this step, the station 2 executes the classifier test function(s) determined in step 43 and associated with the remote station to identify the connection to be used.

The classification is a method that enables the mapping of an SDU on a particular connection between two nodes. It associates an SDU with a connection and creates an association according to the stream characteristics of the service. It enables facilitating the delivery of SDUs with the appropriate constraints of QoS (Quality of Service). A classifier comprises a set of criteria to be respected, applied to each incoming SDU packet (for example an IP destination address), a reference of a connection identifier (CID) and possibly a classification priority. If the packet corresponds to the criteria, it is transmitted to the MAC layer for transmission on the connection associated with the identified CID.

It is presumed that for each remote station RS 120 or 130 more than one connection is open according to one or several parameters, for example:
- any field of an IP frame (particularly a virtual network or VLAN (Virtual Local Area Network), a communication port, a priority, MAC and/or IP addresses, differentiated services using a DSCP (Differentiated Service Code Point) flag, a type of service using a TOS (Type Of Service) field,
- An aggregated video that enables transmission of video data to two nodes belonging to a same sub-network 12 or 13,
- voice over IP that enables transmission of voice over IP data to two nodes belonging to a same sub-network 12 or 13,
- of video, audio or non aggregated voice.

In the example, illustrated by FIG. 5, it is assumed that there are connections with their specific identifier (CID) for:
- aggregated voice over IP, the corresponding SDUs being identified with a specific audio port,
- non-aggregated video, the corresponding SDU being identified by the specific destination IP addresses,
- aggregated video, the corresponding SDUs being identified by a specific video port, and
- for other uses.

Thus, step 44 starts with a test 440, during which the station 2 checks if the SDU corresponds to the determined audio ports. In the affirmative, the classification is made on the connection corresponding to the aggregated voice over IP during a step 441 and step 44 is terminated.

In the negative, during a test 442, the station 2 verifies if the destination address of the SDU is among the set of one or more determined IP addresses. In the affirmative, the classification is made on the connection corresponding to the non-aggregated video during a step 443 and step 44 is terminated.

In the negative, during a test 444, the station 2 verifies if the destination port of the SDU is among the set of one or more determined video ports. In the affirmative, the classification is made on the connection corresponding to the aggregated video during a step 445 and step 44 is terminated.

If not, the classification is made on the connection corresponding to other uses during a step 446 that corresponds to a transmission according to a best effort quality of service and step 44 is terminated. According to a variant of step 446, the incoming packets are discarded without being transmitted.

For an aggregated service (for example aggregated video), the transmission between the base station and an RS does not comprise the identification of destination nodes but comprises an identification of the aggregated service. When the BS receives data packet concerning a service aggregated and destined for nodes placed on the same sub-network 12 and 13, these different packets are transmitted in the same connection to the corresponding RS.

FIG. 6 presents a method implemented in the remote station 3 intended to receive packets from the base station 2 and transmit them to the associated sub-network.

This method begins with an initialisation phase 60 during which the different parameters of the station 3 are updated.

Then, during a step 61, the remote station 3 initialises the classifier functions 333 associated with the base station during the establishment of connections with the base station. The initialisation of classifier functions 333 with correspondence to a CID is, for example, carried out according to the requests of a user.

Then during a step 62, the station 3 waits for and receives at least one PDU from a source node, the PDU being relayed by the base station to the station 3.

Then, during a step 63, the station 3 filters the SDUs while letting pass the SDUs intended for the associated sub-network and eliminating the possible SDU transmitted in a broadcast or multicast diffusion mode initially transmitted by an associated sub-network node.

Then, during a step 64 the station 3 carries out a classification of the SDU according to packets to be transmitted and, during a step 65 transmits it on the associated sub-network to the destination nodes. The step 62 is then repeated.

FIG. 7 shows a classification mechanism with a division in communication protocol layers implemented in the BS 2.

A SDU 71 reaching the BS and destined for a node of a sub-network 12 or 13 is transmitted by an upper layer 70 to a routing layer 72 carrying out step 43

Then, the SDU is transmitted to a convergence sub-layer with descending classifier functions 73 that each point to a connection identified by its CID 741 to 74n.

Then, the information 75 required for transmission (notably SDU, CID) are transmitted to the MAC layer 76 then to the physical layer 75 for a transmission on the wireless link 130.

FIG. 8 shows an example of communication between a source (for example the node 111), the base station 10, the remote station 12 and the destination node placed behind the remote station 12 (for example the node 122) (these elements are represented by vertical lines, the actions, events and/or successive transmissions are shown chronologically).

In a step prerequisite to any transmission to a remote station, the connections are created. Thus, an exchange 801 between the base station 11 and the remote station RS1 12 enables the creation of one or more connections in the upstream sense (remote station to base station) and one or more connections in the downstream sense (base station to remote station). The creation of connections is made for example according to a protocol IEEE 802.16. During this prerequisite step, the classifiers and routing table on the BS 800 side are created or updated and the classifiers on the remote station side are also created.

Next, the node 122 must be identified by the base station. Thus, the node 122 transmits a SDU 180 destined for a node of the sub-network 11 or 13, this SDU containing a node identifier 122 (for example its MAC address and/or its IP address). Then, this SDU is relayed (811) by the remote station 12 to the base station 10. The BS 10 then updates (812) its routing table associating the node 122 with the sub-network placed behind the remote station 12.

Next, the BS can transmit the SDUs destined for the node 122. Hence the source node 111 transmits an SDU 820 destined for the node 122. The BS identifies (821) using its routing table that the node corresponds to a classifier associated with RS1. It uses the corresponding classifier function (822) to identify the connection that may transport the SDU. The BS transmits (823) the SDU on the connection associated with the identified CDI. The station RSI 12 receives this SDU and verifies (824) that it is indeed destined for a node of its sub-network and that the SDU does not correspond to a packet broadcast for which the origin is a node situated on its sub-network. Once this verification has been made, the first remote station 12 transmits (825) the SDU to the destination node 122.

Naturally, the invention is not limited to the embodiments previously described.

In particular, the architecture of the base station and remote stations can be different from those illustrated in FIGS. 2 and 3, in the respective function and/or form of the elements (the functions of the electronic elements can notably be grouped into a restricted number of components or, on the contrary, expanded into several components) and their layout.

The invention is not limited to an architecture as described with respect to FIG. 1 but involves any architecture implementing a wireless network with local (for example a few tens of meters) or remote (for example a few kilometers according notably to a standard IEEE 802.16) coverage with one or more RS, each RS being connected at any time to at least one BS and a sub-network comprising at least one node. It also relates to the architectures of networks where the base station is connected to subscriber stations by one or more wired links.

The invention can also be applied with different communication protocols to those previously described. Hence, the application and/or control data can be transmitted according to any protocol (for example with a contention access or in polling mode) on the wireless links. The communication channels between the RS and the BS can use the same frequency channels for the upward and downward directions (mode known as "half duplex") or different frequency channels (mode known as "full duplex"). The network or the links connecting the source to the SSs can also be unremarkable and is not limited to an Ethernet network. This means, for example, a standardised or proprietary protocol, wired or wireless enabling the data transmission from the source to each of the SSs. The link between a BS and all or part of the RS can be wired or wireless.

Moreover, the packets (SDU) transmitted by a source to the subscriber stations are advantageously and not necessarily split into small packets (PDU) of MAC level. In the examples given previously the boundaries between SDU and PDU coincide. According to the variants of the invention, they do not coincide. According to other variants, a PDU can correspond to one or more SDUs.

The remote stations are advantageously unremarkable stations compatible with the IEEE 802.16 standard. According to variants of the invention, they comprise a part linked to wireless exchanges compatible with the standard IEEE 802.16.

The architecture of the base station is also not limited to the examples previously described. In particular, according to different embodiments, the remote stations can comprise an application part (for example, data processing unit (notably voice and/or images), a camera control unit, etc.) and the RS can be integrated in an item of equipment comprising the radio and communication management part on the wireless link with the base station and the nodes of a network as well as possible control or applicative parts, or, on the contrary, be separated into more than one items of equipment.

Likewise, the architecture of the base stations is also not limited to the examples previously described.

In a general sense, the invention can advantageously be applied to wired and/or wireless networks implementing functions of routing and packet transport with a specific quality of service according to the nature of the packet. The classifiers or the classifier identify the nature of the packets in order to assign it to an adapted connection.

The invention claimed is:

1. A method for transmission of data packets by a first station, the data packets being transmitted to at least two destination nodes belonging to a network comprising a second station, said data packets being associated to services, said data packets being transmitted by said first station to said at least two destination nodes via said second station, wherein the method comprises:
    routing a set of at least one of the data packets to said second station according to identifiers of said at least two destination nodes,
    classifying, in association with said second station, said set of at least one of the data packets, the classifying assigns at least a connection between said first station and said second station to said set of at least one of said data packets according to services associated with said set of at least one data packet, the classifying comprising aggregating said services by assigning a same connection to data packets associated with a same service, the classifying being carried out after the routing, a classification function being associated with an identifier of the second station to which the at least two destination nodes are associated, the classification function comprising at least one test function to test at least one parameter of a packet and assign to the packet a connection,
    transmitting said set on the assigned connection.

2. The method according to claim 1, wherein the routing comprise an access counter.

3. The method according to claim 1, wherein the link between the first station and the second station is a wireless link.

4. The method according to claim 3, wherein the link between the first station and the second station is a link of type IEEE 802.16.

5. A transmission device for transmitting data packets associated to services to at least two destination nodes via a station, wherein the transmission device comprises:
    a router for routing a set of at least one of the data packets to said station according to identifiers of said at least two destination nodes,
    a classifier for classifying, in association with said station, said set of at least one of said data packet, the classifying assigning at least a connection with said station to said set of at least one of said data packets according to services associated with said set of at least one data packet, the classifying comprising aggregating said services by assigning a same connection to data packets associated with a same service, the classifying being carried out after the routing, a classification function being associated with an identifier of the station to which the at least two destination nodes are associated, the classification function comprising at least one test function to test at least one parameter of a packet and assign to the packet a connection,
    a transmitter for transmitting said set of at least one data packet on the assigned connection.

6. The transmission device according to claim 1, wherein the router comprises an access counter.

7. The transmission device according to claim 1, wherein the connection with said station is a wireless connection.

8. The transmission device according to claim 7, wherein the connection with said station is a is a connection of type IEEE 802.16.

* * * * *